(12) United States Patent
Imura

(10) Patent No.: US 11,603,934 B2
(45) Date of Patent: Mar. 14, 2023

(54) SLIDING COMPONENT

(71) Applicant: Eagle Industry Co., Ltd., Tokyo (JP)

(72) Inventor: Tadatsugu Imura, Tokyo (JP)

(73) Assignee: EAGLE INDUSTRY CO., LTD.

( * ) Notice: Subject to any disclaimer, the term of this patent is extended or adjusted under 35 U.S.C. 154(b) by 94 days.

(21) Appl. No.: 16/959,105

(22) PCT Filed: Jan. 11, 2019

(86) PCT No.: PCT/JP2019/000617
§ 371 (c)(1),
(2) Date: Jun. 29, 2020

(87) PCT Pub. No.: WO2019/139107
PCT Pub. Date: Jul. 18, 2019

(65) Prior Publication Data
US 2020/0332901 A1 Oct. 22, 2020

(30) Foreign Application Priority Data
Jan. 12, 2018 (JP) .............................. JP2018-003694

(51) Int. Cl.
*F16J 15/34* (2006.01)
(52) U.S. Cl.
CPC ....... *F16J 15/3424* (2013.01); *F16J 15/3412* (2013.01); *F16J 15/342* (2013.01)
(58) Field of Classification Search
CPC .. F16J 15/3404; F16J 15/3408; F16J 15/3412; F16J 15/342; F16J 15/3424
See application file for complete search history.

(56) References Cited

U.S. PATENT DOCUMENTS

| 3,383,116 A | 5/1968 | Carter ............................ 277/96 |
| 3,527,465 A | 9/1970 | Guinard |

(Continued)

FOREIGN PATENT DOCUMENTS

| CN | 1245552 | 2/2000 | ............... F16J 15/34 |
| CN | 2460801 | 11/2001 | ............... F16J 15/40 |

(Continued)

OTHER PUBLICATIONS

A Second Office Action dated Jul. 25, 2016 by the State Intellectual Property Office of China counterpart application No. 201380029125.0.

(Continued)

*Primary Examiner* — Nicholas L Foster
(74) *Attorney, Agent, or Firm* — Hayes Soloway P.C.

(57) ABSTRACT

A sliding component has an annular mating ring and an annular seal ring opposite to each other and causing respective sliding surfaces thereof to slidably rotate relative to each other, to seal a sealed fluid present on radially inner or outer side of the sliding surfaces. In the sliding surface of the seal ring, a plurality of dynamic pressure recesses is formed separately arranged in a circumferential direction, the dynamic pressure recesses generating a dynamic pressure by a relative sliding rotation between the mating ring and the seal ring. In the sliding surface of the mating ring, a plurality of static pressure recesses is formed in the circumferential direction at positions where the static pressure recesses cooperate with the dynamic pressure recesses to enable the sealed fluid to flow the static pressure recesses to the dynamic pressure recesses. The static pressure recesses is deeper than the dynamic pressure recesses.

20 Claims, 8 Drawing Sheets

(56) References Cited

U.S. PATENT DOCUMENTS

| | | | |
|---|---|---|---|
| 3,675,935 A * | 7/1972 | Ludwig | F16J 15/342 |
| | | | 277/400 |
| 3,704,019 A | 11/1972 | McHugh | 277/400 |
| 3,782,737 A | 1/1974 | Ludwig et al. | 277/27 |
| 4,056,478 A | 11/1977 | Capelli | C01M 5/00 |
| 4,071,253 A | 1/1978 | Heinen et al. | 277/3 |
| 4,523,764 A | 6/1985 | Albers et al. | 277/3 |
| 4,889,348 A | 12/1989 | Amundson | 277/306 |
| 5,071,141 A | 12/1991 | Lai et al. | |
| 5,092,612 A | 3/1992 | Victor et al. | 277/96.1 |
| 5,174,584 A | 12/1992 | Lahrman | 277/400 |
| 5,180,173 A | 1/1993 | Kimura et al. | |
| 5,224,714 A | 7/1993 | Kimura | 277/400 |
| 5,447,316 A | 9/1995 | Matsui | 277/400 |
| 5,556,111 A | 9/1996 | Sedy | 277/400 |
| 5,558,341 A | 9/1996 | McNickle | 277/400 |
| 5,769,604 A | 6/1998 | Gardner et al. | 415/170.1 |
| 5,834,094 A | 11/1998 | Etsion et al. | 428/156 |
| 5,947,481 A | 9/1999 | Young | 277/400 |
| 5,952,080 A | 9/1999 | Etsion et al. | 428/156 |
| 6,002,100 A | 12/1999 | Etsion | 219/121.71 |
| 6,046,430 A | 4/2000 | Etsion | 219/121.71 |
| 6,135,458 A | 10/2000 | Fuse | 277/401 |
| 6,152,452 A | 11/2000 | Wang | 277/400 |
| 6,213,473 B1 | 4/2001 | Lebeck | |
| 6,446,976 B1 | 9/2002 | Key et al. | F16J 15/34 |
| 6,692,006 B2 | 2/2004 | Holder | 277/346 |
| 6,726,213 B2 | 4/2004 | Wang | 277/400 |
| 7,258,346 B2 | 8/2007 | Tejima | 277/399 |
| 7,377,518 B2 | 5/2008 | Lai | 277/400 |
| 7,758,051 B2 | 7/2010 | Roberts-Haritonov | 277/401 |
| 7,931,277 B2 | 4/2011 | Garrison | 277/399 |
| 8,100,405 B2 | 1/2012 | Kneeland et al. | 277/355 |
| 8,342,534 B2 | 1/2013 | Vasagar | 277/399 |
| 8,585,060 B2 | 11/2013 | Oshii et al. | 277/401 |
| 9,151,390 B2 * | 10/2015 | Hosoe | F16J 15/3408 |
| 9,169,931 B2 * | 10/2015 | Tokunaga | F16J 15/34 |
| 9,228,660 B2 | 1/2016 | Hosoe | F16J 15/3412 |
| 9,347,566 B2 | 5/2016 | Tokunaga | F16J 15/34 |
| 9,353,867 B2 | 5/2016 | Itadani et al. | F16J 15/3448 |
| 9,494,239 B2 * | 11/2016 | Hosoe | F16J 15/3412 |
| 9,512,923 B2 | 12/2016 | Inoue et al. | F16J 15/34 |
| 9,556,960 B2 | 1/2017 | Thelke et al. | F16J 15/34 |
| 9,574,667 B2 | 2/2017 | Takahashi et al. | F16J 15/342 |
| 9,772,037 B2 | 9/2017 | Itadani et al. | F16J 15/3412 |
| 9,784,372 B2 * | 10/2017 | Iguchi | F16J 15/3412 |
| 9,850,953 B2 | 12/2017 | Tokunaga | F16C 33/741 |
| 9,863,473 B2 | 1/2018 | Hosoe et al. | F16C 33/741 |
| 9,958,010 B2 | 5/2018 | Itadani | F16C 33/74 |
| 9,982,715 B2 | 5/2018 | Gorges et al. | F16C 33/201 |
| 10,054,230 B2 | 8/2018 | Katori et al. | F16J 15/3412 |
| 10,132,411 B2 | 11/2018 | Hosoe et al. | F16J 15/164 |
| 10,337,620 B2 | 7/2019 | Tokunaga et al. | F16J 15/342 |
| 10,443,737 B2 * | 10/2019 | Itadani | F16J 15/342 |
| 10,495,228 B2 * | 12/2019 | Itadani | F16J 15/342 |
| 10,865,883 B2 | 12/2020 | Seki et al. | F16J 15/3404 |
| 11,248,706 B2 * | 2/2022 | Imura | F16C 33/74 |
| 11,320,052 B2 | 5/2022 | Imura et al. | F16J 15/34 |
| 2002/0014743 A1 | 2/2002 | Zheng | 277/358 |
| 2002/0093141 A1 | 7/2002 | Wang | F16J 15/34 |
| 2002/0158416 A1 | 10/2002 | Hosanna | F16J 15/3404 |
| 2004/0080112 A1 | 4/2004 | Tejima | F16J 15/3436 |
| 2005/0212217 A1 | 9/2005 | Tejima | 277/399 |
| 2005/0263963 A1 | 12/2005 | Lai | 277/399 |
| 2007/0228664 A1 | 10/2007 | Anand | F16J 15/3496 |
| 2007/0267820 A1 | 11/2007 | Martin | F16J 15/3496 |
| 2007/0275267 A1 | 11/2007 | Sabouni | F16J 15/3496 |
| 2007/0296156 A1 | 12/2007 | Yanagisawa et al. | 277/352 |
| 2008/0100001 A1 | 5/2008 | Flaherty | |
| 2009/0200749 A1 * | 8/2009 | Teshima | F16J 15/3484 |
| | | | 277/512 |
| 2011/0215531 A1 | 9/2011 | Tokunaga et al. | 277/399 |
| 2011/0215535 A1 | 9/2011 | Vasagar | 277/559 |
| 2011/0305871 A1 | 12/2011 | Tabuchi | F16J 15/3284 |
| 2012/0018957 A1 | 1/2012 | Watanabe | F16J 15/34 |
| 2012/0217705 A1 | 8/2012 | Hosoe | 277/400 |
| 2013/0168928 A1 | 7/2013 | Schrfer et al. | C10M 103/02 |
| 2013/0209011 A1 | 8/2013 | Tokunaga | |
| 2014/0159314 A1 | 6/2014 | Hosoe | F16J 15/34 |
| 2014/0197600 A1 * | 7/2014 | Hosoe | F16J 15/342 |
| | | | 277/409 |
| 2014/0217676 A1 | 8/2014 | Hosoe et al. | 377/350 |
| 2014/0319776 A1 | 10/2014 | Theike et al. | |
| 2015/0115540 A1 | 4/2015 | Tokunaga | F16J 15/34 |
| 2015/0123350 A1 | 5/2015 | Itadani | F16J 15/3412 |
| 2015/0167847 A1 | 6/2015 | Tokunaga | |
| 2015/0345642 A1 | 12/2015 | Haas | F16J 15/3496 |
| 2015/0377297 A1 | 12/2015 | Tokunaga et al. | F16C 33/748 |
| 2016/0033045 A1 | 2/2016 | Itadani et al. | F16J 15/3412 |
| 2016/0097457 A1 | 4/2016 | Sun et al. | F16J 15/3412 |
| 2017/0241549 A1 * | 8/2017 | Itadani | F16J 15/3412 |
| 2017/0261107 A1 | 9/2017 | Martin | F16J 15/3452 |
| 2017/0350407 A1 | 12/2017 | Yamamoto et al. | F04D 29/046 |
| 2018/0017163 A1 | 1/2018 | Hosoe et al. | F16J 15/164 |
| 2018/0073394 A1 | 3/2018 | Tokunaga et al. | F01D 25/18 |
| 2018/0112711 A1 | 4/2018 | Itadani | F16J 15/363 |
| 2018/0128377 A1 | 5/2018 | Tukunaga et al. | F16J 15/342 |
| 2018/0128378 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0195618 A1 * | 7/2018 | Itadani | F16J 15/342 |
| 2018/0299015 A1 | 10/2018 | Itadani | F16J 15/3448 |
| 2019/0170257 A1 | 6/2019 | Hosoe et al. | F16J 15/3412 |
| 2019/0285115 A1 | 9/2019 | Negishi et al. | F16C 17/045 |
| 2019/0301522 A1 | 10/2019 | Negishi et al. | F16C 17/02 |
| 2019/0331162 A1 | 10/2019 | Negishi | F16J 15/34 |
| 2020/0224768 A1 * | 7/2020 | Imura | F16J 15/3412 |
| 2020/0240470 A1 | 7/2020 | Sorgenti | F16J 15/3212 |
| 2020/0332901 A1 | 10/2020 | Imura | F16J 15/3412 |
| 2021/0041026 A1 * | 2/2021 | Imura | F16J 15/3424 |
| 2021/0048062 A1 | 2/2021 | Masumi et al. | F16C 17/102 |
| 2021/0048106 A1 | 2/2021 | Imura et al. | F16J 15/3412 |
| 2021/0080009 A1 | 3/2021 | Kimura et al. | F16J 15/3412 |
| 2021/0116030 A1 | 4/2021 | Kimura et al. | F16J 15/182 |
| 2021/0364034 A1 * | 11/2021 | Okada | F16J 15/342 |

FOREIGN PATENT DOCUMENTS

| | | | |
|---|---|---|---|
| CN | 1401924 | 3/2003 | F16J 15/16 |
| CN | 101644333 | 2/2010 | F16J 15/34 |
| CN | 201496542 | 6/2010 | F16J 15/16 |
| CN | 101793169 | 8/2010 | F01D 11/08 |
| CN | 101861485 | 10/2010 | F16J 15/34 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |
| CN | 104685273 | 6/2015 | F16J 15/34 |
| CN | 106029294 | 10/2016 | B23K 26/364 |
| CN | 205877184 | 1/2017 | F16J 15/16 |
| CN | 205877198 | 1/2017 | F16J 15/34 |
| CN | 106439023 | 2/2017 | F16J 15/16 |
| CN | 107489770 | 12/2017 | F16J 15/34 |
| CN | 110770456 | 2/2020 | F16C 33/12 |
| CN | 111656065 | 9/2020 | F16J 15/34 |
| DE | 3223703 | 6/1982 | F16J 15/34 |
| DE | 102008038396 | 2/2010 | |
| EP | 0369295 | 11/1988 | F16J 15/34 |
| EP | 0637706 | 8/1993 | F16J 15/34 |
| EP | 2138225 | 12/2009 | B01J 13/20 |
| EP | 2754931 | 7/2014 | F16J 15/34 |
| EP | 3196516 | 7/2017 | F16J 15/34 |
| EP | 3217049 | 9/2017 | F16J 15/34 |
| EP | 3396186 | 10/2018 | F16C 13/10 |
| EP | 3575621 | 12/2019 | F16C 33/10 |
| EP | 3575643 | 12/2019 | F16J 15/34 |
| EP | 3650722 | 5/2020 | F16C 33/12 |
| FR | 2342440 | 9/1997 | F16J 15/34 |
| GB | 2263952 | 8/1993 | F16J 15/34 |
| JP | S51-034974 | 3/1976 | |
| JP | S52-143571 | 10/1977 | F16J 15/26 |
| JP | 57163770 | 10/1982 | F16J 15/3412 |

(56) References Cited

FOREIGN PATENT DOCUMENTS

| | | | |
|---|---|---|---|
| JP | S59-195253 | 12/1984 | ............... F16J 15/34 |
| JP | S59-195254 | 12/1984 | ............... F16J 15/34 |
| JP | S63-190975 | 8/1988 | ............... F16J 15/34 |
| JP | H02-236067 | 9/1990 | ............... F16J 15/34 |
| JP | H02-136863 | 11/1990 | ............... F16J 15/34 |
| JP | H04-50559 | 2/1992 | ............... F16J 15/34 |
| JP | H04-337165 | 11/1992 | ............... F16J 15/34 |
| JP | H05-60247 | 3/1993 | ............... F16J 15/34 |
| JP | H05-296248 | 11/1993 | |
| JP | H05-90049 | 12/1993 | ............... F16J 15/34 |
| JP | H06-17941 | 1/1994 | ............... F16J 15/34 |
| JP | H06-117547 | 4/1994 | ............... F16J 15/34 |
| JP | H06-174107 | 6/1994 | ............... F16J 15/34 |
| JP | H06-323442 | 11/1994 | ............... F16J 15/34 |
| JP | H06-105105 | 12/1994 | ............... F16J 15/34 |
| JP | 9-89119 | 3/1997 | ............... F16J 15/34 |
| JP | 9-292034 | 11/1997 | ............... F16J 15/34 |
| JP | H10-281299 | 10/1998 | ............ F16J 15/344 |
| JP | H10-292867 | 11/1998 | |
| JP | H11-287329 | 10/1999 | ............... F16J 15/34 |
| JP | 3066367 | 5/2000 | ............... F16J 15/34 |
| JP | 2001-12458 | 1/2001 | ............ F16C 17/10 |
| JP | 2003-343730 | 12/2003 | ............... F16J 15/22 |
| JP | 2005-180652 | 7/2005 | ............... F16J 15/34 |
| JP | 2005-315391 | 11/2005 | |
| JP | 2005-337503 | 12/2005 | ............... F16J 15/34 |
| JP | 2006-77899 | 3/2006 | ............... F16J 15/34 |
| JP | 2006-90524 | 4/2006 | ............ F16C 17/02 |
| JP | 2006-183702 | 7/2006 | ............ F16C 17/04 |
| JP | 2007-162045 | 6/2007 | |
| JP | 2008-106940 | 5/2008 | ............... F16J 15/34 |
| JP | 2011-74931 | 4/2011 | ............... F16J 15/34 |
| JP | 2011-185292 | 9/2011 | ............... F16J 15/34 |
| JP | 2012-2295 | 1/2012 | ............... F16J 15/34 |
| JP | 2012-062534 | 3/2012 | |
| JP | 2012-122135 | 6/2012 | ............ C25D 15/02 |
| JP | 2013-213545 | 10/2013 | ............ F16C 32/06 |
| JP | 2014-529052 | 10/2014 | |
| JP | 2015-063647 | 4/2015 | |
| JP | 2015-68330 | 4/2015 | ............ F04C 29/00 |
| JP | 5693599 | 4/2015 | |
| JP | 2016-80090 | 5/2016 | ............... F16J 15/34 |
| JP | 5960145 | 7/2016 | ............... F16J 15/34 |
| WO | WO 2006/051702 | 5/2006 | ............... F16J 15/34 |
| WO | WO 2011/115073 | 9/2011 | ............... F16J 15/34 |
| WO | WO 2012/046749 | 4/2012 | ............... F16J 15/34 |
| WO | WO 2013/035503 | 3/2013 | ............... F16J 15/34 |
| WO | WO 2013053411 | 4/2013 | |
| WO | WO2014061544 | 4/2014 | |
| WO | WO2014148316 | 9/2014 | ............... F16J 15/34 |
| WO | WO2014148317 | 9/2014 | ............... F16J 15/34 |
| WO | WO 2014/174725 | 10/2014 | ............... F16J 15/34 |
| WO | WO2015111707 | 7/2015 | ............... F16J 15/18 |
| WO | WO2016035860 | 3/2016 | ............... F16J 15/34 |
| WO | WO 2016/167262 | 10/2016 | ............... F16J 15/34 |
| WO | WO 2016/186015 | 11/2016 | ............... F16J 15/34 |
| WO | WO 2016/186019 | 11/2016 | ............... F16J 15/34 |
| WO | WO 2016/186020 | 11/2016 | ............... F16J 15/34 |
| WO | WO 2016/203878 | 12/2016 | ............... F16J 15/34 |
| WO | WO 2017/002774 | 1/2017 | ............... F16J 15/34 |
| WO | WO 2017/061406 | 4/2017 | ............... F16J 15/34 |
| WO | WO 2018/092742 | 5/2018 | ............... F16J 15/34 |
| WO | WO 2018/105505 | 6/2018 | ............... F16J 33/12 |
| WO | WO2018/139231 | 8/2018 | ............... F16J 15/34 |

OTHER PUBLICATIONS

First Notification of Reason for Refusal with Search Report dated. Sep. 25, 2015 by the State Intellectual Property Office of China for Chinese counterpart application No. 201380029125.0.
First Notification of Reason for Refusal with Search Report issued by the State Intellectual Property Office of China dated Aug. 24, 2015 for Chinese counterpart application No. 201380024836.9.
First Notification of Reason for Refusal with Search Report issued by the State Intellectual Property Office of China dated Aug. 26, 2015 for Chinese counterpart application No. 201380009242.0.
Second Notification of Reason for Refusal with issued by the State Intellectual Property Office of China dated Feb. 5, 2016 for Chinese counterpart application No. 201380024836.9.
First Office Action issued in Chinese Patent Appln. Serial No. 2019800007372.8, dated Sep. 27, 2021, with English translation, 13 pages.
International Preliminary Report on Patentability and Written Opinion issued in PCT/JP2013/070713, dated Feb. 10, 2015.
International Search Report (ISR) dated Oct. 29, 2013, issued for International application No. PCT/JP2013/070713.
International Search Report and Written Opinion issued in PCT/JP2013/070714, dated Oct. 29, 2013, with English translation, 14 pages.
International Preliminary Report on Patentability issued in PCT/JP2013/070714, dated Feb. 10, 2015.
International Search Report and Written Opinion issued in PCT/JP2019/003381, with English translation, dated Apr. 2, 2019, 20 pages.
International Preliminary Report on Patentability issued in PCT/JP2019/003381, with English translation, dated Aug. 4, 2020, 12 pages.
International Search Report and Written Opinion issued in PCT/JP2020/003645, dated Mar. 24, 2020, with English translation, 21 pages.
International Preliminary Report on Patentability issued in PCT/JP2020/003645, dated Aug. 10, 2021, with English translation, 11pages.
International Search Report and Written Opinion issued in PCT/JP2020/003641, dated Mar. 31, 2020, with English translation, 13 pages.
International Preliminary Report on Patentability issued in PCT/JP2020/003641, dated Aug. 10, 2021, with English translation, 7 pages.
International Search Report and Written Opinion issued in PCT/JP2020/003643, dated Mar. 17, 2020, with English translation, 17 pages.
International Preliminary Report on Patentability issued in PCT/JP2020/003643, dated Aug. 10, 2021, with English translation, 10 pages.
International Search Report and Written Opinion issued in PCT/JP2020/003648, dated Mar. 10, 2020, with English translation, 13 pages.
International Preliminary Report on Patentability issued in PCT/JP2020/003648, dated Aug. 10, 2021, with English translation, 7 pages.
International Search Report and Written Opinion issued in PCT/JP2020/003647, dated Mar. 24, 2020, with English translation, 14 pages.
International Preliminary Report on Patentability issued in PCT/JP2020/003647, dated Aug. 10, 2021, with English translation, 8 pages.
International Search Report and Written Opinion issued in PCT/JP2020/003643, dated Apr. 28, 2020, with English translation, 12 pages.
International Preliminary Report on Patentability issued in PCT/JP2020/011926, dated Sep. 28, 2021, 4 pages.
Korean Official Action issued in related Korean Patent Application Serial No. 10-2020-7019822, dated Oct. 26, 2021 with English translation (4 pages).
European Search Report issued in related European Patent Application Serial No. 19738181.7, dated Sep. 13, 2021 (10 pages).
European Search Report issued in related European Patent Application Serial No. 19748058.5, dated Oct. 8, 2021 (9 pages).
Office Action issued in U.S. Appl. No. 16/964,943, dated Oct. 4, 2021, 19 pages.
International Preliminary Report on Patentability issued in PCT/JP2019/000617, dated Jul. 14, 2020, with English translation, 13 pages.

(56) References Cited

OTHER PUBLICATIONS

International Search Report and Written Opinion issued in PCT/JP2019/000617, dated Apr. 10, 2019, with English translation, 21 pages.
First Office Action issued in Chinese Patent Appln. Serial No. 201980010219.0, dated Nov. 30, 2021, with English translation, 13 pages.
Notice of Allowance issued in U.S. Appl. No. 16/964,943, dated Jan. 11, 2022, 8 pages.
Korean Official Action issued in related Korean Patent Application Serial No. 10-2020-7022307, dated Nov. 26, 2021 with translation, 13 pages.
Official Action issued in European Patent Application Serial No. 17841422.3, dated Feb. 15, 2022, 5 pages.
Chinese Official Action issued in related Chinese Patent Application Serial No. 201980007372.8, dated May 26, 2022 with translation, 13 pages.
European Search Report issued in related European Patent Application Serial No. 20752802.7, dated Oct. 11, 2022 (7 pages).
European Search Report issued in related European Patent Application Serial No. 20752708, dated Oct. 4, 2022 (7 pages).
European Search Report issued in related European Patent Application Serial No. 20752625, dated Oct. 4, 2022 (10 pages).
European Search Report issued in related European Patent Application Serial No. 20752804, dated Oct. 11, 2022 (7 pages).
European Search Report issued in related European Patent Application Serial No. 20752709, dated Oct. 11, 2022 (9 pages).
Chinese Official Action issued in related Chinese Patent Application Serial No. 201980010219.0, dated Apr. 18, 2022 with translation, 17 pages.
U.S. Appl. No. 16/964,943, filed Jul. 24, 2020, Imura et al.
U.S. Appl. No. 17/424,847, filed Jul. 21, 2021, Hashimoto et al.
U.S. Appl. No. 17/424,850, filed Jul. 21, 2021, Ou et al.
U.S. Appl. No. 17/425,277, filed Jul. 22, 2021, Imura et al.
U.S. Appl. No. 17/425,281, filed Jul. 22, 2021, Suzuki.
U.S. Appl. No. 17/425,678, filed Jul. 23, 2021, Suzuki et al.
U.S. Appl. No. 17/433,561, filed Aug. 24, 2021, Miyazaki et al.
Second Office Action issued in Chinese Patent Appln. Serial No. 201980007372.8, dated May 26, 2022, with English translation, 13 pages.
First Office Action issued in Chinese Patent Appln. Serial No. 202080010586.3, dated Aug. 8, 2022, with English translation, 15 pages.
First Office Action issued in Chinese Patent Appln. Serial No. 202080010580.6, dated Aug. 2, 2022, with English translation, 12 pages.
First Office Action issued in Chinese Patent Appln. Serial No. 202080010628.3, dated Aug. 2, 2022, with English translation, 15 pages.
First Office Action issued in Chinese Patent Appln. Serial No. 202080010661.6, dated Jul. 19, 2022, with English translation, 15 pages.
First Office Action issued in Chinese Patent Appln. Serial No. 202080011045.2, dated Jul. 18, 2022, with English translation, 10 pages.
First Office Action issued in Chinese Patent Appln. Serial No. 202080018532.1, dated Aug. 24, 2022, with English translation, 14 pages.
International Search Report and Written Opinion and International Preliminary Report on Patentability issued in PCT/JP2017/040830, dated Jan. 30, 2018, with English translations, 15 pages.
Notice of Allowance issued in U.S. Appl. No. 16/322,811, dated Apr. 19, 2022, 11 pages.

\* cited by examiner

SLIDING COMPONENT

TECHNICAL FIELD

The present invention relates to a sliding component comprising a pair of sliding parts that rotate relative to each other, for example, sliding parts suitable for a mechanical seal in an automobile, general industrial machinery, or other seal fields.

BACKGROUND ART

As a sealing device for preventing leakage of a sealed fluid, in a sealing device, for example, a mechanical seal, composed of two parts configured to rotate relative to each other and to have their end faces on a planar surface sliding relative to each other, opposing conditions of "sealing" and "lubrication" must be compatible in order to maintain sealing performance for a long time. In particular, in recent years, there has been an increasing demand for a further friction reduction in order to reduce mechanical loss while preventing leakage of the sealed fluid for environmental measures and the like. As a technique of reducing friction, by generating a dynamic pressure between sliding surfaces by slidably rotating the sliding surfaces with a liquid film interposed therebetween, this can be achieved.

Conventionally, as a mechanical seal configured to generate a dynamic pressure between sliding surfaces by rotation, for example, a sealing device described in Patent Citation 1 is known. In a sliding surface of a mating ring, which is one of sliding parts, a plurality of dynamic pressure generating grooves for generating a dynamic pressure during rotation is provided. A sliding surface of a seal ring, which is the other of the sliding parts, is formed to be flat. When the sliding parts rotate relative to each other, a negative pressure is generated on the upstream side of the dynamic pressure generating grooves in a rotating direction, while a positive pressure is generated on the downstream side thereof, and the positive pressure is increased by a wedge effect of end face walls on the downstream side in the rotating direction of the dynamic pressure generating grooves. Thus, the positive pressure acts as a whole to obtain large buoyancy.

In the sealing device disclosed in the Patent Citation 1, since the positive pressure is generated between the sliding surfaces, the fluid flows out of the positive pressure portion to the outside of the sliding surfaces. This outflow of the fluid corresponds to leakage of a sealed fluid in the case of a seal. Therefore, some sealing devices have been developed in which fine grooves or the like are formed inside or outside the dynamic pressure generating groove to provide a pumping function, and at the time of starting the sliding component, directional fluid is caused to flow between sliding surfaces to reduce leakage (for example, see Patent Citation 2).

CITATION LIST

Patent Literature

Patent Citation 1: JP 3066367 B1 (page 3, FIG. 1)
Patent Citation 2: JP 5960145 B2 (page 10, FIG. 4)

SUMMARY OF INVENTION

Technical Problem

Meanwhile, also in a sliding component for high-pressure sealed fluid, further improvement of "sealing" and "lubrication" is required. In a sliding component in Patent Citation 2, as the sealed fluid becomes high pressure, a pumping action tends to unexpectedly become low even if the groove shape (defined by depth, width, length, angle, etc.) of the fine grooves for pumping is optimized, and leakage could not be sufficiently prevented while maintaining lubricity. Further, it is conceivable to generate a dynamic pressure by dynamic pressure generating grooves as in the sealing device in Patent Document 1, however, because the sealed fluid is at a high pressure, the depth of the dynamic pressure generating grooves needs to be low in order to obtain large buoyancy. In this case, the sealed fluid is not sufficiently supplied to the dynamic pressure generating grooves, causing poor lubrication, and lubricity could be thus deteriorated. As described above, according to the technology of any of the Patent Citations, in a sliding component for high-pressure sealed fluid, unfortunately, it is difficult to maintain so-called fluid lubrication by the function of the dynamic pressure generation grooves, thereby resulting in the fact that a sliding component with more leakage or high torque is provided.

The present invention has been made to solve the problems of the prior art, and its object is to provide a sliding component with less leakage of a high-pressure sealed fluid and low torque.

Solution to Problem

In order to solve the problems described above, a sliding component according to the present invention includes a first seal ring and a second seal ring that are opposite to each other and cause respective sliding surfaces thereof to slidably rotate relative to each other, to seal a sealed fluid present on a radially inner or outer side of the sliding surfaces of the first and second seal rings. In the sliding surface of the first seal ring and the seal ring, a plurality of dynamic pressure recesses is formed to be separately arranged in a circumferential direction, the dynamic pressure recesses generating a dynamic pressure by a relative sliding rotation and sliding between the first seal ring and the second seal ring. In the sliding surface of the second seal ring, a plurality of static pressure recesses is formed in the circumferential direction at positions where the static pressure recesses cooperate with the dynamic pressure recesses to enable the sealed fluid to flow from the static pressure recesses to the dynamic pressure recesses, the static pressure recesses being deeper than the dynamic pressure recesses. According to the aforesaid configuration, during the relative sliding rotation between the sliding surfaces of the first and second seal rings, the sealed fluid can be supplied from the static pressure recesses to the dynamic pressure recesses through an opposite portion or the vicinity of the opposite portion of the static pressure recesses deeper than the dynamic pressure recesses, so that the dynamic pressure can be reliably generated without poor lubrication. At this time, the dynamic pressure recesses mainly function to generate a dynamic pressure between the sliding surfaces to adjust a contact surface pressure between the sliding surfaces, and the static pressure recesses mainly function to supply the sealed fluid held therein to the side of the dynamic pressure recesses. Accordingly, the dynamic pressure is generated to such an extent that the first seal ring and the second seal ring do not completely float relative to each other, so that the contact surface pressure is reduced while the sliding surfaces are in contact with each other. Thus, a sliding component with less leakage of a high-pressure sealed fluid and low torque can be obtained.

Preferably, the plurality of the dynamic pressure recesses and the plurality of the static pressure recesses might at least overlap with each other in a radial direction. According to this configuration, during the relative sliding rotation between the sliding surfaces of the first and second seal rings, the sealed fluid can reliably flow through the opposite portion of the static pressure recesses deeper than the dynamic pressure recesses and be supplied from the static pressure recesses to the dynamic pressure recesses, so that the dynamic pressure can be reliably generated without poor lubrication.

Preferably, the dynamic pressure recesses might be open toward the radially inner or outer side where the sealed fluid is present. According to this configuration, the static pressure of the sealed fluid is applied to the dynamic pressure recesses, so that the dynamic pressure can be reliably generated without poor lubrication.

Preferably, each of the dynamic pressure recesses might have a strip shape. According to this configuration, the dynamic pressure recesses and the static pressure recesses can cooperate with each other to increase efficiency of the dynamic pressure generation and efficiency of the static pressure generation.

Preferably, each of the static pressure recesses might be a dimple. According to this configuration, the dynamic pressure recesses and the static pressure recesses can cooperate with each other to increase efficiency of the dynamic pressure generation and efficiency of the static pressure generation.

Preferably, each of the dynamic pressure recesses might have a strip shape extending in the circumferential direction in a plan view, and each of the static pressure recesses might be a dimple. According to this configuration, the dynamic pressure recesses and the static pressure recesses can cooperate with each other to increase efficiency of the dynamic pressure generation and efficiency of the static pressure generation.

Preferably, the dynamic pressure recesses might be arranged only on the radially inner or outer side where the sealed fluid is present. According to this configuration, during the relative sliding rotation between the first seal ring and the second seal ring, poor lubrication on the radially inner or outer side where the sealed fluid is present can be prevented.

Preferably, the dynamic pressure recesses might be arranged only in a region of one quarter or less of the sliding surface of the first seal ring on the radially inner or outer side where the sealed fluid is present. According to this configuration, during the relative sliding rotation between the first seal ring and the second seal ring, poor lubrication in the sliding surfaces on the radially inner or outer side where the sealed fluid is present can be prevented, and leakage of the sealed fluid can be reduced without generating excessive buoyancy.

Preferably, the static pressure recesses might be arranged in an entire region of the sliding surface of the second seal ring. According to this configuration, the static pressure recesses supply the sealed fluid to the opposite dynamic pressure recesses and hold the sealed fluid therein at locations where the static pressure recesses are not opposite the dynamic pressure recesses, thus making it unlikely to cause poor lubrication.

Preferably, the static pressure recesses might have a depth dimension larger than a maximum opening diameter dimension of the static pressure recesses in a plan view. According to this configuration, the function of the static pressure recesses supplying the sealed fluid to the opposite dynamic pressure recesses can be enhanced, and the function of the static pressure recesses holding the sealed fluid therein at locations where the static pressure recesses are not opposite the dynamic pressure recesses can be enhanced.

Preferably, the sealed fluid might be a high-pressure liquid of 0.1 MPa or more. According to the eleventh aspect, even when the sealed fluid is at a high pressure, the surface roughness of the sliding surface is reduced and the leakage is reduced.

DESCRIPTION OF EMBODIMENTS

Modes for implementing a sliding component according to the present invention will be described below based on embodiments.

First Embodiment

A sliding component according to a first embodiment of the present invention will be described with reference to FIGS. 1 to 5. In the first embodiment, a mechanical seal, which is an example of the sliding component, will be described. In addition, a radially outer peripheral side of sliding parts constituting the mechanical seal is described as a sealed fluid side, and a radially inner peripheral side thereof as an atmosphere side.

Figure 1:
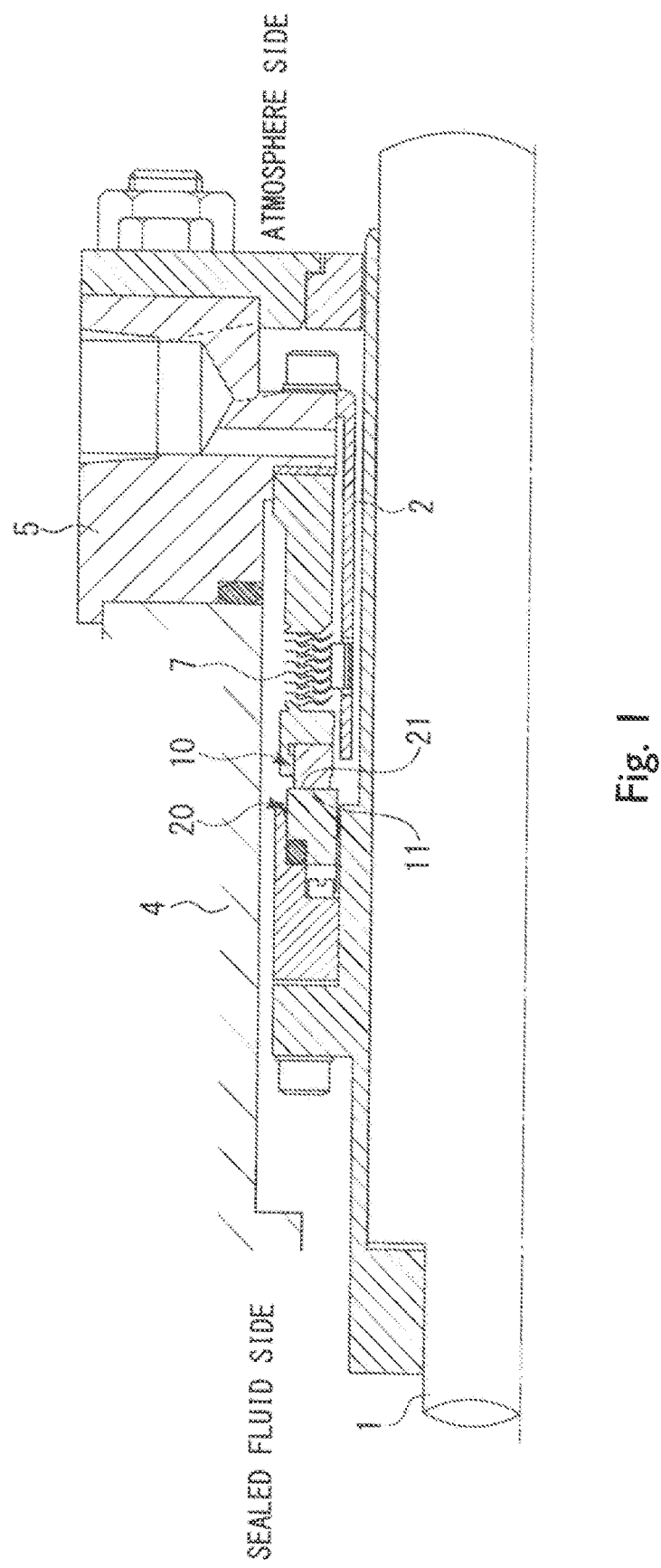
FIG. 1 is a sectional view showing a sliding component as a mechanical seal for general industrial machinery, according to a first embodiment of the present invention.

The mechanical seal for general industrial machinery shown in FIG. 1 is of an inside type of sealing a sealed fluid that tends to leak from the outer peripheral side to the inner peripheral side of a sliding surface. The mechanical seal mainly includes a mating ring 20 as an annular sliding part provided via a sleeve 2 on the side of a rotating shaft 1 in a state of being integrally rotatable with the rotating shaft 1, and a seal ring 10 as an annular sliding part provided at a seal cover 5, which is fixed to a housing 4 of the installed equipment, in a non-rotating state and in an axially movable state. The seal ring 10 is axially biased by a bellows 7, so that a sliding surface 11 of the seal ring 10 and a sliding surface 21 of the mating ring 20, which are mirror-finished by lapping or the like, slide in close contact with each other. Note that the sealed fluid in the present embodiment is a high-pressure liquid of 0.1 MPa or more.

The seal ring 10 and the mating ring 20 are typically formed of SiC (regarded as hard material) or a combination of SiC (regarded as hard material) and carbon (regarded as soft material), but not limited thereto, and any sliding material can be applied as long as it is used as a sliding material for a mechanical seal. The SiC includes a sintered compact with boron, aluminum, carbon or the like as sintering aids, as well as a material composed of two or more phases having different components and compositions, for example, SiC in which graphite particles are dispersed, reaction-sintered SiC composed of SiC and Si, SiC—TiC, SiC—TiN, and the like. As carbon, carbon in which a carbonaceous material and a graphite material are mixed, as well as resin-molded carbon, sintered carbon, and the like, can be used. In addition to the sliding materials described above, metal materials, resin materials, surface modification materials (or coating materials), composite materials, and the like are also applicable.

Figure 2:
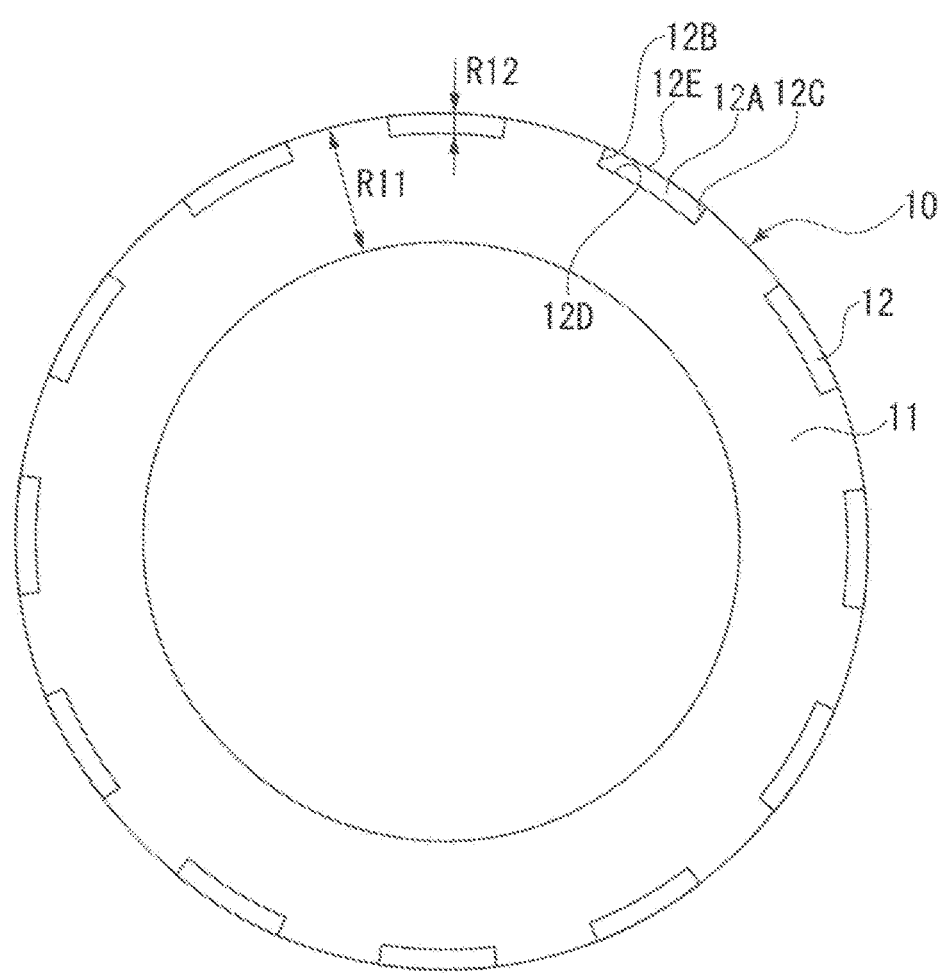
FIG. 2 is a plan view showing a sliding surface of a seal ring in which dynamic pressure recesses are formed in the first embodiment of the present invention.

As shown in FIG. 2, the seal ring 10 has a sliding surface 11 at one axial end which has an annular shape when viewed from the front in an axial direction, i.e., in a plan view. The sliding surface 11 is a flat surface, in which a plurality of recessed grooves 12 as circumferentially separated dynamic pressure recesses are formed. The sliding surface 11 can be also a land portion with respect to the recessed grooves 12.

The recessed grooves 12 are each defined by a bottom 12A formed as a plane parallel to the sliding surface 11, radial walls 12B and 12C formed as wall surfaces perpendicular to the bottom 12A, and a circumferential wall 12D formed as a wall surface perpendicular to the bottom surface 12A and the radial walls 12B and 12C. Each of the recesses grooves 12 has an opening 12E which has a substantially rectangular shape when viewed from the side and is open in a radially outward direction, on the sealed fluid side. The recessed grooves 12 are formed as grooves which have a strip shape extending in a circumferential direction of the sliding surface 11 when viewed from the front in the axial direction. In addition, the recessed grooves 12 according to the present embodiment are formed by laser processing, but not limited to this, and may be formed by other methods.

Further, twelve recessed grooves 12 are arranged at equal intervals in the circumferential direction of the sliding surface 11. The number and interval of the recessed grooves 12 are not limited to this. However, if the number of the recessed grooves 12 is too large, the generated dynamic pressure is large, and if the number is too small, the change in dynamic pressure acting in the circumferential direction of the sliding surface 11 is large. Therefore, it is preferable that 6 to 24 recessed grooves 12 are arranged at equal intervals.

Further, the circumferential length of the recessed grooves 12 and the length (i.e., interval) between the recessed grooves 12, 12 adjacent to each other in the circumferential direction are substantially the same. Note that the circumferential length and interval of the recessed grooves 12 in the sliding surface 11 are not limited to this.

Further, the axial depth of the recessed grooves 12 is less than 5 μm, preferably 1 μm or more, and the radial length R12 of the recessed grooves 12 is one half or less, preferably one quarter or less, of the radial length R11 of the sliding surface 11 (see FIG. 2). As a result, the total force (buoyancy) of all the dynamic pressures generated in the recessed grooves 12 does not become too large. The recessed grooves 12 are also arranged only in a region on the radially outer side in a radial direction of the sliding surface 11. In addition, it is preferable that the recessed grooves 12 are not arranged on the radially inner side of the sliding surface 11. This makes the radially outer side of the sliding surface 11 unlikely to directly come into contact with the opposite sliding surface 21 during the relative rotation between the seal ring 10 and the mating ring 20, thereby preventing poor lubrication on the radially outer side with a high rotation speed. Furthermore, the circumferential length c12 of the recessed grooves 12 (see FIG. 5) is formed to be longer than the radial length R12 of the recessed grooves 12 (see FIG. 2).

Figure 3:
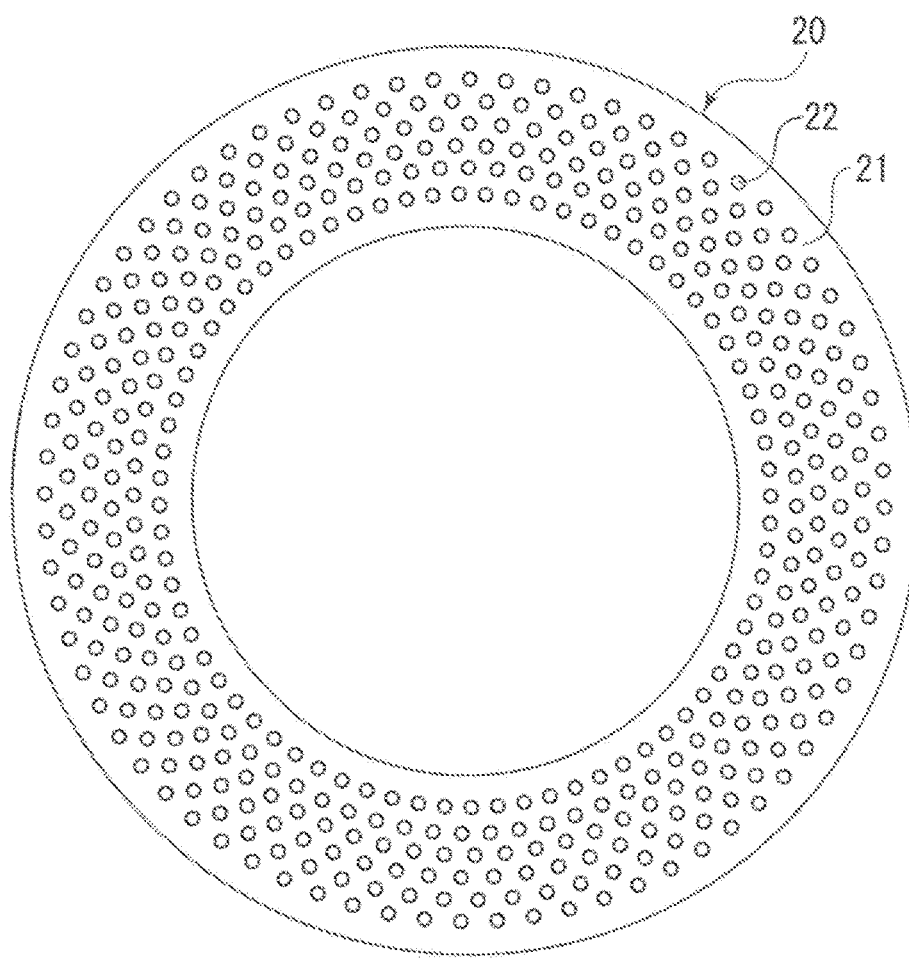
FIG. 3 is a plan view showing a sliding surface of a mating ring as another seal ring arranged opposite the seal ring shown in FIG. 2, in which static pressure recesses are formed.

As shown in FIG. 3, the mating ring 20 has the annular sliding surface 21 that is opposite the sliding surface 11 of the seal ring 10 in the axial direction. The sliding surface 21 is a flat surface in which a plurality of dimples 22 as static pressure recesses is formed in the entire surface in the circumferential direction. The sliding surface 21 can be also a land portion with respect to the dimple 22.

Figure 4:
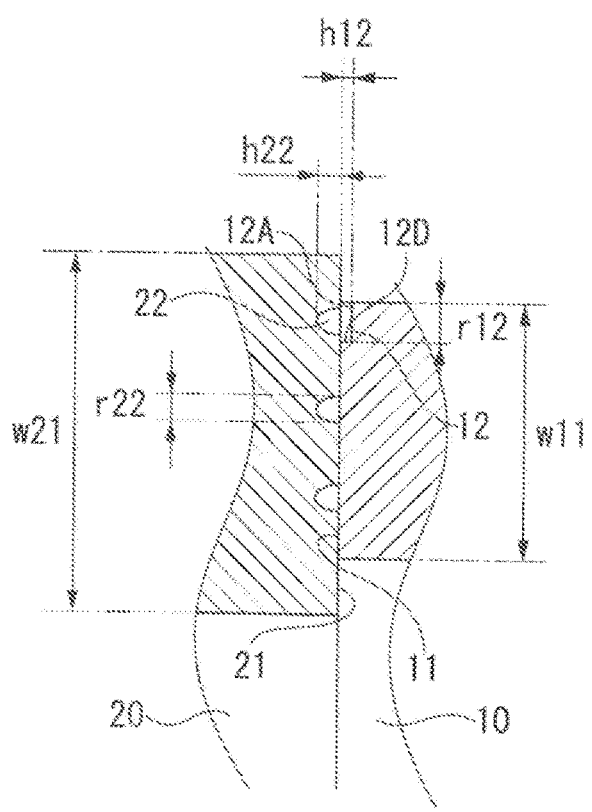
FIG. 4 is a cross-sectional view of the seal ring and the mating ring in FIGS. 2 and 3 during non-rotation, taken in a radial direction.

Further, the radial length w21 of the sliding surface 21 of the mating ring 20 is formed to be longer than the radial length w11 of the sliding surface 11 of the seal ring 10 (i.e., w11<w21) as shown in FIG. 4. This reduces the maximum radial length r12 of the recessed grooves 12 arranged on the radially outer side of the sliding surface 11 of the seal ring 10.

The dimples 22 are formed in a semi-spheroidal shape having a circular shape (see FIG. 3) when viewed from the front in the axial direction, a substantially elliptical cross section in the radial direction (see FIG. 4), and a substantially elliptical cross section in the circumferential direction (see FIG. 5), and six dimples are radially arranged in a zigzag manner in the entire region of the sliding surface 21. Note that the entire region of the sliding surface 21 indicates a surface region that is capable of substantially sliding with the sliding surface 11. In addition, the dimples 22 in this embodiment are formed by laser processing, but is not limited to this, and may be formed by other methods.

Further, the depth dimension h22 of the dimples 22 is formed to be larger than the maximum opening diameter dimension r22 of the dimples 22 when viewed from the front (i.e., r22<h22) as shown in FIG. 4. This can improve the function of the dimples 22 supplying the sealed fluid to the opposite recessed grooves 12, and can improve the function of the dimples 22 holding the sealed fluid therein at locations where the dimples 22 are not opposite the recessed grooves 12. The depth dimension h22 of the dimples 22 may be also formed to be smaller than or substantially the same as the maximum opening diameter dimension r22 of the dimples 22 when viewed from the front. In addition, the axial depth of the dimples 22 is preferably 10 μm or more at which the wedge effect does not sufficiently act.

Figure 5:
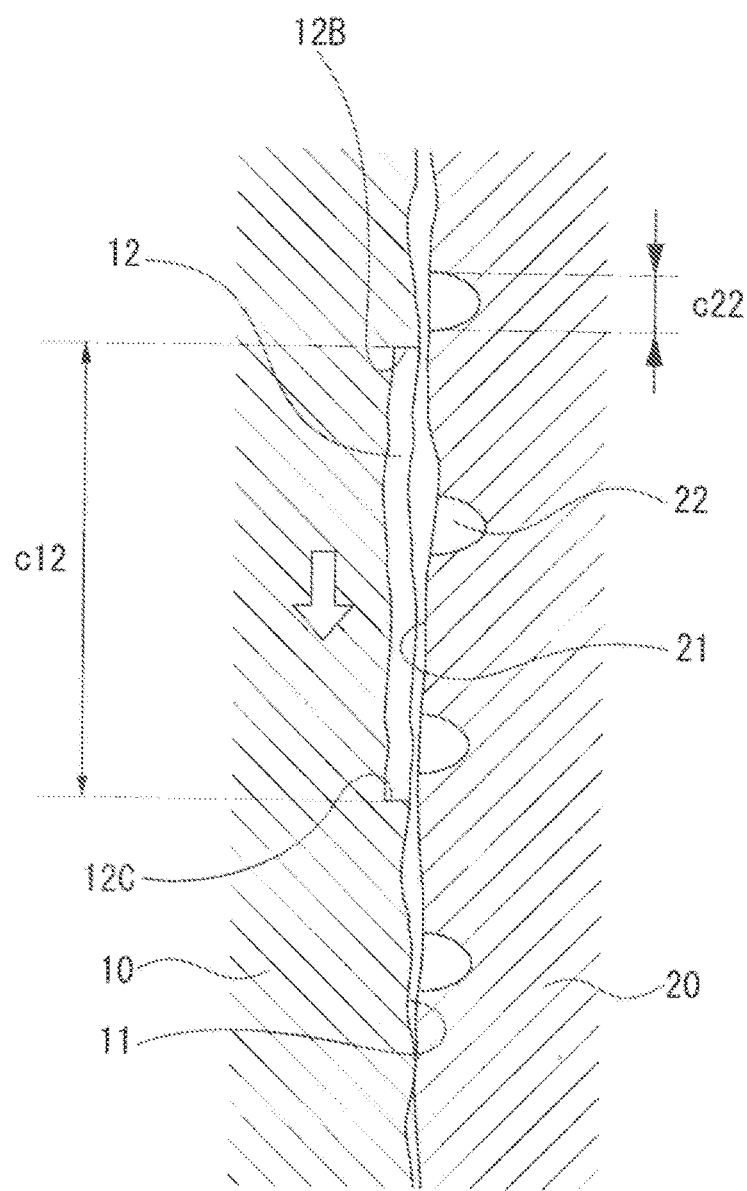
FIG. 5 is a schematic cross-sectional view for describing generation of dynamic pressure by the seal ring and the mating ring in FIGS. 2 and 3 during rotation, taken in a circumferential direction.

As shown in FIG. 4, the depth dimension h22 of the dimples 22 is formed to be larger than the depth dimension h12 of the recessed grooves 12 (i.e., h12<h22). In addition, the maximum radial length r12 of the recessed grooves 12 is formed to be longer than the maximum radial length r22 of the dimples 22 (i.e., r22<r12). Furthermore, as shown in FIG. 5, the maximum circumferential length c12 of the recessed grooves 12 is formed to be longer than the maximum circumferential length c22 of the dimples 22 (i.e., c22<c12). Thus, the recessed grooves 12 and the dimples 22 at least overlap in the radial direction between the sliding surfaces 11 and 21.

Next, generation of dynamic pressure between the sliding surfaces 11 and 21 will be described hereinafter. As shown in FIG. 5, when the seal ring 10 and the mating ring 20 rotate relative to each other with a rotating direction being a direction indicated by a white arrow from the side of the radial wall 12B to the side of the radial wall 12C in FIG. 5, a negative pressure is generated on an end point side of the rotating direction of the recessed grooves 12 (that is, on the side of the radial wall 12C in FIG. 5), while the positive pressure is generated on a start point side of the counter rotating direction (that is, on the side of the radial wall 12B in FIG. 5). The positive pressure is increased by the wedge effect of the radial wall 12B on the start point side of the counter rotating direction of the recessed grooves 12, and the positive pressure acts as a whole to obtain large buoyancy. In addition, the sealed fluid is supplied from the dimples 22 to the recessed grooves 12 through the opposite portion or the vicinity of the opposite portion of the dimples 22 deeper than the recessed grooves 12, so that the dynamic pressure can be reliably generated without poor lubrication. At this time, the recessed grooves 12 mainly function to generate a dynamic pressure between the sliding surfaces 11 and 21 to adjust a contact surface pressure between the sliding surfaces 11 and 21, and the dimples 22 mainly function to supply the sealed fluid held therein to the side of the recessed grooves 12 and to introduce a static pressure from the sealed fluid side on the radially inner side of the sliding surface 11 in which the recessed grooves 12 are not formed. Furthermore, the static pressure by the sealed fluid is introduced into the recessed grooves 12 from an opening 12E which has a substantially rectangular shape when viewed from the side and is open in a radially outward direction, on the sealed fluid side, so that the recessed grooves 12 contribute to generate the dynamic pressure between the sliding surfaces 11 and 21. As schematically shown in FIG. 5, the sliding surfaces 11 and 21 microscopically have a wavy shape due to surface roughness, undulation, and deformation due to dynamic pressure.

As described above, the cooperation between the recessed grooves 12 and the dimples 22 generates a dynamic pressure to such an extent that the seal ring 10 and the mating ring 20 do not completely float relative to each other. Thus, the sliding surfaces 11 and 21 are brought into mixed lubrication in which hydrodynamic lubrication and boundary lubrication are mixed, and are brought into a state of being partially in contact with each other. Therefore, while both sliding surfaces 11 and 21 are in contact with each other, the contact surface pressure is reduced, so that a sliding component with less leakage of the high-pressure sealed fluid and low torque can be obtained. Furthermore, the low torque allows the surface roughness of the sliding surfaces 11 and 21 to be reduced. Unlike the first embodiment, a conventional dynamic pressure generating groove generates a fluid film serving as fluid lubrication.

As a modification of the recessed grooves 12 according to the first embodiment, the radial walls 12B and 12C may not be perpendicular to the bottom 12A, and may, for example, intersect with the bottom 12A in an inclined state. In addition, the bottom 12A may not be parallel to the sliding surface 11, and may be, for example, an inclined surface. Furthermore, the bottom 12A may not be a flat surface, and may be, for example, a curved surface.

Figure 6A:
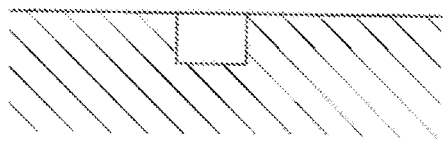
FIGS. 6A and 6B are cross-sectional views showing modifications of the static pressure recesses according to the first embodiment.
Figure 6B:

As a modification of the dimples 22 according to the first embodiment, the cross-sectional shape of the dimples 22 may be formed in a rectangular shape as shown in FIG. 6A and a conical shape as shown in FIG. 6B.

Second Embodiment

Next, a sliding component according to a second embodiment of the present invention will be described with reference to FIG. 7. The same constitutional elements as those shown in the embodiment described above are denoted by the same reference numerals, and redundant description will be omitted.

Figure 7A:
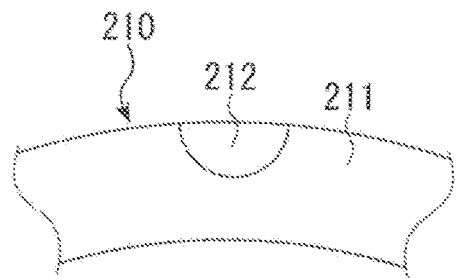
FIGS. 7A to 7G are plan views showing a sliding surface of a seal ring of a sliding component according to a second embodiment of the present invention, in which dynamic pressure recesses are formed.

The sliding component according to the second embodiment will be described. As shown in FIG. 7A, a recessed groove 212 as one of dynamic pressure recesses is formed in a sliding surface 211 of a seal ring 210 and has a semicircular shape when viewed from the front in the axial direction. The recessed groove 212 is open in a radially outward direction, on the sealed fluid side.

Figure 7B:
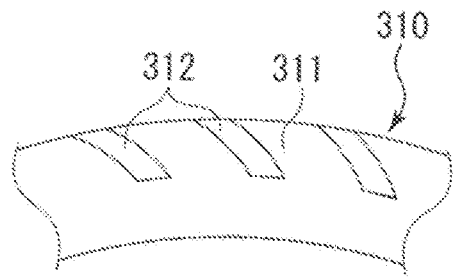

Further, as shown in FIG. 7B, spiral grooves 312 as dynamic pressure recesses are formed in a sliding surface 311 of a seal ring 310. The spiral grooves 312 are open in the radially outward direction, on the sealed fluid side, and are closed on a radially inner side.

Figure 7C:
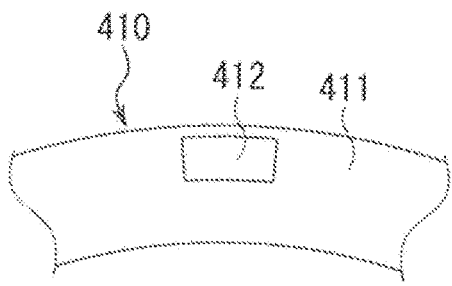

Further, as shown in FIG. 7C, a recessed groove 412 as one of dynamic pressure recesses is formed in a sliding surface 411 of a seal ring 410 and has a substantially rectangular shape when viewed from the front in the axial direction. The recessed groove 412 is continuously surrounded by a land portion and is thus not open in the radially outward direction, on the sealed fluid side.

Figure 7D:
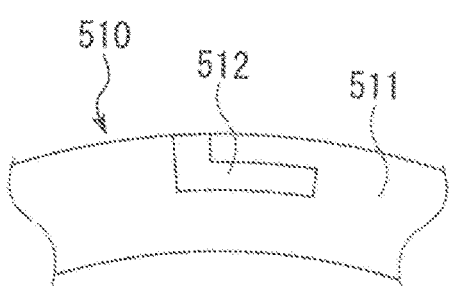

Further, as shown in FIG. 7D, a Rayleigh step 512 as one of dynamic pressure recesses is formed in a sliding surface 511 of a seal ring 510 and has a substantially L shape when viewed from the front in the axial direction. In the Rayleigh step 512, grooves extending in the radial direction and the circumferential direction have the same depth, and the groove extending in the radial direction is open in the radially outward direction, on the sealed fluid side.

Figure 7E:
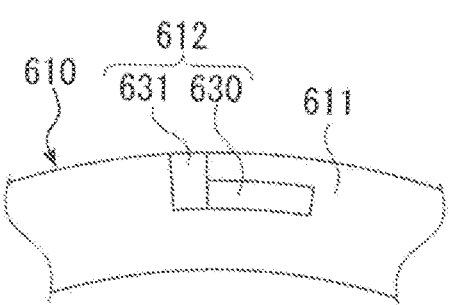

Further, as shown in FIG. 7E, a Rayleigh step 612 as one of dynamic pressure recesses is formed in a sliding surface 611 of a seal ring 610 and has a substantially L shape when viewed from the front in the axial direction. In the Rayleigh step 612, a deep groove 631 extending in the radial direction are continuously formed with a groove 630 extending in the circumferential direction, and the deep groove 631 is open in the radially outward direction, on the sealed fluid side.

Figure 7F:
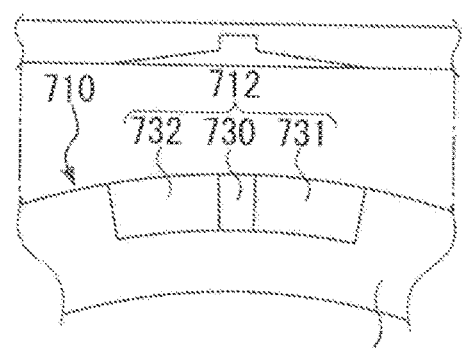

Further, as shown in FIG. 7F, a recessed groove 712 as one of dynamic pressure recesses is formed in a sliding surface 711 of a seal ring 710 and has a substantially rectangular shape when viewed from the front in the axial direction. The recessed groove 712 is constituted by a deep groove 730 formed substantially at the center of the recessed groove 712 in the circumferential direction and a pair of inclined grooves 731 and 732 are continuously formed on both sides of the deep groove 730 in the circumferential direction. The entire recessed groove 712 is open in the radially outward direction, on the sealed fluid side.

Figure 7G:
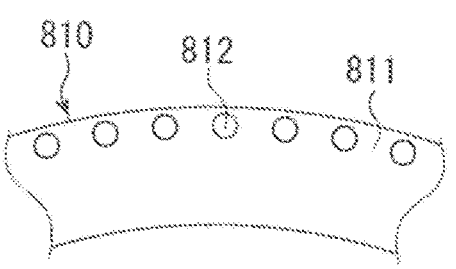

Further, as shown in FIG. 7G, dimples 812 as dynamic pressure recesses having a circular shape when viewed from the front in the axial direction are formed in a sliding surface 811 of a seal ring 810. The dimples 812 are arranged only on the radially outer side of the sliding surface 811 of the seal ring 810. Although not shown, for convenience of explanation, the maximum radial length of the dimples 812 is formed to be larger than the maximum radial length of the dimples 22 formed in the sliding surface 21 of the mating ring 20.

Note that the depth of the respective dynamic pressure recesses in FIGS. 7A to 7G in the axial direction of the seal rings is formed to be shallow so that dynamic pressure can be sufficiently generated.

Third Embodiment

Next, a sliding component according to a third embodiment of the present invention will be described with reference to FIG. 8. The same constitutional elements as those shown in the embodiments described above are denoted by the same reference numerals, and redundant description will be omitted.

Figure 8A:
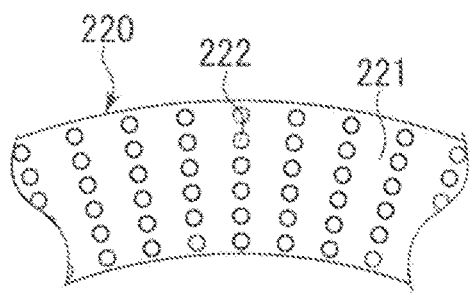
FIGS. 8A to 8F are plan views showing a sliding surface of a mating ring of a sliding component according to a third embodiment of the present invention, in which static pressure recesses are formed.

The sliding component according to the third embodiment will be described. As shown in FIG. 8A, a plurality of dimples 222 as static pressure recesses having a circular shape when viewed from the front in the axial direction is formed in a sliding surface 221 of a mating ring 220. The dimples 222 are arranged in the radial direction and the circumferential direction throughout the entire surface of the sliding surface 221.

Figure 8B:
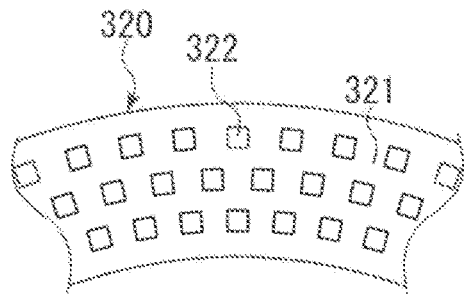

Further, as shown in FIG. 8B, a plurality of dimples 322 as static pressure recesses having a rectangular shape when viewed from the front in the axial direction is formed in a sliding surface 321 of a mating ring 320. The dimples 322 are arranged in the radial direction and in the circumferential direction in a zigzag manner throughout the entire surface of the sliding surface 321.

Figure 8C:
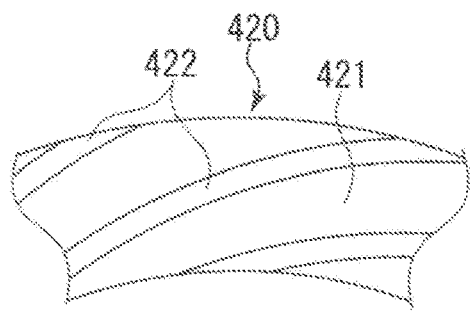

Further, as shown in FIG. 8C, spiral grooves 422 as dynamic pressure recesses are formed in a sliding surface 421 of a mating ring 420. The spiral grooves 422 are arranged in the entire surface of the sliding surface 421, and are open in the radially outward direction i.e., toward the sealed fluid side, and in the radially inward direction.

Figure 8D:
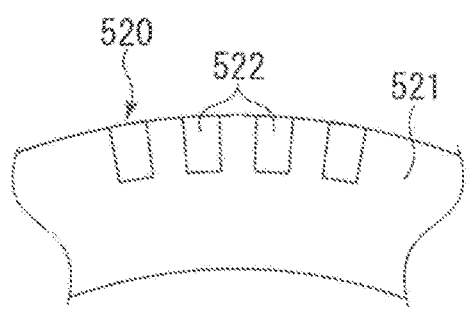

Further, as shown in FIG. 8D, a plurality of recessed grooves 522 as static pressure recesses which are adjacent to each other in the circumferential direction and have a rectangular shape when viewed from the front in the axial direction is formed in a sliding surface 521 of a mating ring 520. The recessed grooves 522 are arranged only on the radially outer side of the sliding surface 521, and are open in the radially outward direction, on the sealed fluid side.

Figure 8E:
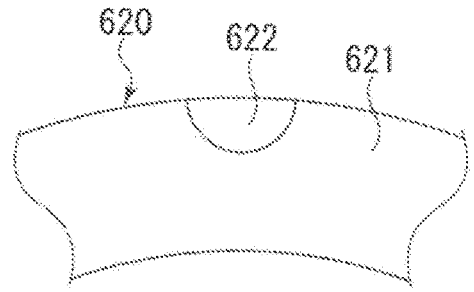

Further, as shown in FIG. 8E, a recessed groove 622 as one of static pressure recesses is formed in a sliding surface 621 of a mating ring 620 and has a semicircular shape when viewed from the front in the axial direction. The recessed groove 622 is open in the radially outward direction, on the sealed fluid side.

Figure 8F:
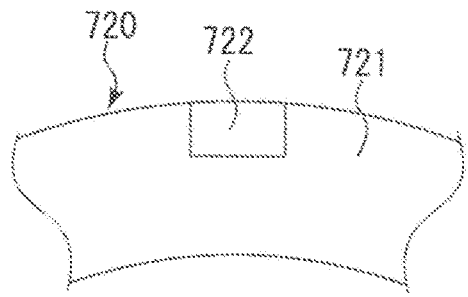

Further, as shown in FIG. 8F, a recessed groove 722 as one of static pressure recesses is formed in a sliding surface 721 of a mating ring 720 and has a substantially rectangular shape when viewed from the front in the axial direction. The recessed groove 722 is open in the radially outward direction, on the sealed fluid side.

Note that the axial depth of the respective static pressure recesses formed in the mating rings in FIGS. 8A to 8F is formed so deep that the dynamic pressure is not sufficiently generated, so that a sealed fluid can be supplied and held.

Although the embodiments according to the present invention have been described above with reference to the drawings, specific configurations are not limited to these embodiments, and changes and additions without departing from the scope of the present invention are also included in the present invention.

Further, in the embodiments described above, the case where the sliding component is a mechanical seal has been described as an example. However, the present invention is not to be construed as being limited to this, and without departing from the scope of the present invention, various changes, modifications, and improvements can be made based on the knowledge of those skilled in the art.

For example, as a sliding component, a mechanical seal for general industrial machinery has been described as an example, however, other mechanical seals for a water pump, or the like may be used. In addition, a mechanical seal may be of an outside type.

Further, in the embodiments described above, an example in which the dynamic pressure recesses are provided in the seal ring, and the static pressure recesses are provided in the mating ring, however, the static pressure recesses may be provided in the seal ring, and the dynamic pressure recesses may be provided in the mating ring.

Further, although a mechanical seal has been described as an example of a sliding component, a sliding component other than a mechanical seal such as a sliding bearing may be applicable.

REFERENCE SIGNS LIST

1 Rotating shaft
2 Sleeve
4 Housing
5 Seal cover
7 Bellows
10 Seal ring (First or Second seal ring)
11 Sliding surface
12 Recessed groove (dynamic pressure recess)
12A Bottom
12B, 12C Radial wall
12D Circumferential wall
12E Opening
20 Mating ring (Second or First seal ring)
21 Sliding surface
22 Dimple (static pressure recess)
210 to 810 Seal ring (sliding part)
211 to 811 Sliding surface
212 Recessed groove (dynamic pressure recess)
220 to 710 Mating ring (sliding part)
221 to 721 Sliding surface
222 Dimple (static pressure recess)
312 Spiral groove (dynamic pressure recess)
322 Dimple (static pressure recess)
412 Recessed groove (dynamic pressure recess)
422 Spiral groove (static pressure recess)
512 Rayleigh step (dynamic pressure recess)
522 Recessed groove (static pressure recess)
612 Rayleigh step (dynamic pressure recess)
622 Recessed groove (static pressure recess)
712 Recessed groove (dynamic pressure recess)
722 Recessed groove (static pressure recess)
812 Dimple (dynamic pressure recess)

The invention claimed is:

1. A sliding component comprising a first seal ring and a second seal ring that are opposite to each other and having respective sliding surfaces thereof configured to slidably rotate relative to each other, and configured to seal a sealed fluid on a radially inner or outer side of the sliding surfaces of the first and second seal rings, wherein
in the sliding surface of the first seal ring, a plurality of dynamic pressure recesses is formed to be separately arranged in a circumferential direction, the dynamic pressure recesses for generating a dynamic pressure upon a relative sliding rotation between the first seal ring and the second seal ring, in the sliding surface of the second seal ring, a plurality of static pressure recesses is formed in the circumferential direction at positions where the static pressure recesses cooperate with the dynamic pressure recesses, the static pressure recesses being deeper than a deepest part of the dynamic pressure recesses and deeper than 10 μm, and each of the static pressure recesses is formed in a rectangular shape, a U-shape or a V-shape in a cross section.

2. The sliding component according to claim 1, wherein the plurality of dynamic pressure recesses and the plurality of static pressure recesses at least overlap with each, other in a radial direction.

3. The sliding component according to claim 1, wherein the dynamic pressure recesses are open toward the radially inner or outer side where the sealed fluid is intended to be present.

4. The sliding component according to claim 3, wherein each of the dynamic pressure recesses has a strip shape.

5. The sliding component according to claim 1, wherein each of the static pressure recesses is a dimple.

6. The sliding component according to claim 1, wherein each of the dynamic pressure recesses has a strip shape extending in the circumferential direction in a plan view, and each of the static pressure recesses is a dimple.

7. The sliding component according to claim 1, wherein the dynamic pressure recesses are arranged only on the radially inner or outer side where the sealed fluid is intended to be present.

8. The sliding component according to claim 7, wherein the dynamic pressure recesses are arranged only in a region of one quarter or less of the sliding surface of the first seal ring on the radially inner or outer side where the sealed fluid is intended to be present.

9. The sliding component according to claim 1, wherein the static pressure recesses are arranged in an entire region of the sliding surface of the second seal ring.

10. The sliding component according to claim 1, wherein the static pressure recesses have a depth dimension larger than a maximum opening diameter dimension of the static pressure recesses in the plan view.

11. The sliding component according to claim 1, wherein the sealed fluid can be a high-pressure liquid of 0.1 MPa or more.

12. The sliding component according to claim 2, wherein the dynamic pressure recesses are open toward the radially inner or outer side where the sealed fluid is intended to be present.

13. The sliding component according to claim 12, wherein each of the dynamic pressure recesses has a strip shape.

14. The sliding component according to claim 12, wherein each of the static pressure recesses is a dimple.

15. The sliding component according to claim 2, wherein each of the dynamic pressure recesses has a strip shape extending in the circumferential direction in a plan view, and each of the static pressure recesses is a dimple.

16. The sliding component according to claim 3, wherein each of the static pressure recesses is a dimple.

17. The sliding component according to claim 3, wherein each of the dynamic pressure recesses has a strip shape extending in the circumferential direction in a plain view, and each of the static pressure recesses is a dimple.

18. The sliding component according to claim 4, wherein each of the static pressure recesses is a dimple.

19. The sliding component according to claim 2, wherein the dynamic pressure recesses are arranged only on the radially inner or outer side where the sealed fluid is intended to be present.

20. The sliding component according to claim 19, wherein the dynamic pressure recesses are arranged only in a region of one quarter or less of the sliding surface of the first seal ring on the radially inner or outer side where the sealed fluid is intended to be present.

* * * * *